United States Patent
Schnorbus

(10) Patent No.: US 9,371,781 B2
(45) Date of Patent: Jun. 21, 2016

(54) NOX ADJUSTMENT CONTROL WITH INTERNAL AND EXTERNAL EXHAUST GAS RECIRCULATION

(75) Inventor: Thorsten Schnorbus, Aachen (DE)

(73) Assignee: FEV GMBH, Aachen (DE)

( * ) Notice: Subject to any disclaimer, the term of this patent is extended or adjusted under 35 U.S.C. 154(b) by 745 days.

(21) Appl. No.: 13/339,730

(22) Filed: Dec. 29, 2011

(65) Prior Publication Data
US 2013/0000600 A1 Jan. 3, 2013

(30) Foreign Application Priority Data
Dec. 31, 2010 (DE) .......................... 10 2010 056 514

(51) Int. Cl.
*F02M 25/07* (2006.01)
*F02B 47/08* (2006.01)
(Continued)

(52) U.S. Cl.
CPC ........ *F02D 13/0219* (2013.01); *F02D 13/0261* (2013.01); *F02D 35/023* (2013.01); *F02D 35/025* (2013.01); *F02D 41/0047* (2013.01); *F02D 41/0052* (2013.01); *F02D 41/0062* (2013.01); *F02D 41/0065* (2013.01); *F02D 41/1462* (2013.01); *F02D 41/1467* (2013.01); *F02M 26/46* (2016.02); *F02B 3/06* (2013.01); *F02B 29/0406* (2013.01); *F02D 2041/007* (2013.01); *F02D 2041/1433* (2013.01); *F02M 26/01* (2016.02); *F02M 26/07* (2016.02);
(Continued)

(58) Field of Classification Search
CPC ............ F02D 13/0219; F02D 13/0261; F02D 35/023; F02D 41/0052; F02D 41/1467; F02D 41/0065; F02D 41/1462; F02D 41/0062; F02D 35/025; F02D 2041/007; F02M 25/0707; F02M 25/0754; F02M 25/0755; F02M 25/0752; F02M 25/0709; F02M 2026/004; F02M 2026/009; F02M 26/01; F02M 26/07; Y02T 10/18; Y02T 10/47; F02B 3/06; F02B 29/0406
USPC ............. 123/568.11, 568.12, 568.13, 568.14, 123/568.21, 568.26, 568.15; 701/108; 60/278
See application file for complete search history.

(56) References Cited

U.S. PATENT DOCUMENTS 6,212,467 B1 * 4/2001 Guzella .................... F02D 21/08
123/568.21
6,247,457 B1 * 6/2001 Mallebrein ............. F02B 47/08
123/520
(Continued)

FOREIGN PATENT DOCUMENTS

CN 101657624 A 2/2010
DE 3401362 A1 8/1984
(Continued)

*Primary Examiner* — Stephen K Cronin
*Assistant Examiner* — Brian Kirby
(74) *Attorney, Agent, or Firm* — Dinsmore & Stohl LLP

(57) ABSTRACT

A method for reducing a nitrogen oxide emission in a diesel engine. The method can include taking at least one exhaust gas of an in engine combustion in a combustion chamber and: segmenting a first portion of exhaust gas enters as an internal exhaust gas recirculation from the combustion chamber of the diesel engine via an outlet valve associated with the combustion chamber, and is recirculated, via the outlet valve, from the subsequent exhaust gas tract, into the combustion chamber of the diesel engine; segmenting a second portion of exhaust gas remains in the combustion chamber and is not expelled; and segmenting a third portion of exhaust gas is recirculated as external exhaust gas recirculation via an exhaust gas recirculation valve into the combustion chamber.

15 Claims, 11 Drawing Sheets

(51) Int. Cl.
*F02D 13/02* (2006.01)
*F02D 41/00* (2006.01)
*F02D 35/02* (2006.01)
*F02D 41/14* (2006.01)
*F02B 3/06* (2006.01)
*F02B 29/04* (2006.01)

(52) U.S. Cl.
CPC .... *F02M2026/004* (2016.02); *F02M 2026/009* (2016.02); *Y02T 10/18* (2013.01); *Y02T 10/47* (2013.01)

(56) References Cited

U.S. PATENT DOCUMENTS

| | | | | |
|---|---|---|---|---|
| 6,328,003 B1* | 12/2001 | Gaertner | F02M 26/43 | 123/568.12 |
| 6,360,159 B1 | 3/2002 | Miller et al. | | |
| 6,378,508 B1* | 4/2002 | Braun | F02D 41/0072 | 123/568.12 |
| 6,530,361 B1* | 3/2003 | Shiraishi | F02B 1/12 | 123/305 |
| 6,748,936 B2* | 6/2004 | Kinomura | F02D 13/0207 | 123/406.29 |
| 6,848,435 B2* | 2/2005 | Kitamura | F02M 25/0754 | 123/568.11 |
| 6,871,642 B1* | 3/2005 | Osterwald | F02B 37/025 | 123/559.1 |
| 6,925,971 B1* | 8/2005 | Peng | F02B 71/04 | 123/46 R |
| 6,932,063 B1* | 8/2005 | Hu | F02D 13/0223 | 123/568.14 |
| 6,964,256 B2* | 11/2005 | Kataoka et al. | | 123/295 |
| 6,981,492 B2* | 1/2006 | Barba | F02D 13/0261 | 123/568.11 |
| 7,000,380 B2* | 2/2006 | Tokuyasu | F02D 13/0219 | 123/295 |
| 7,069,907 B2* | 7/2006 | Sasaki | F02D 35/02 | 123/432 |
| 7,089,913 B2* | 8/2006 | Yamaoka | F02B 11/00 | 123/406.48 |
| 7,093,568 B2* | 8/2006 | Yang | F02B 1/12 | 123/27 R |
| 7,096,837 B2* | 8/2006 | Kieninger | F01L 1/146 | 123/90.16 |
| 7,128,063 B2* | 10/2006 | Kang | F02D 13/0265 | 123/568.14 |
| 7,143,753 B2* | 12/2006 | Tanaka | F01L 1/34 | 123/568.14 |
| 7,174,713 B2* | 2/2007 | Nitzke | F02D 41/0007 | 123/568.21 |
| 7,191,052 B2* | 3/2007 | Barba | F02D 41/0072 | 123/568.21 |
| 7,213,553 B2* | 5/2007 | Kalish | F01L 1/181 | 123/568.11 |
| 7,281,368 B2* | 10/2007 | Miyake | F02D 1/0052 | 123/403 |
| 7,314,041 B2* | 1/2008 | Ogawa | F02D 13/0265 | 123/568.14 |
| 7,334,573 B2* | 2/2008 | Shiraishi | F02D 15/02 | 123/568.14 |
| 7,337,766 B2* | 3/2008 | Nakayama | F02D 35/02 | 123/435 |
| 7,444,999 B2* | 11/2008 | Kitamura | F01L 1/185 | 123/568.11 |
| 7,588,019 B2* | 9/2009 | Casal Kulzer | | 123/568.14 |
| 7,703,442 B2* | 4/2010 | Sauer | F02D 13/0265 | 123/435 |
| 7,706,958 B2* | 4/2010 | Itoga | F01L 1/185 | 123/295 |
| 8,042,527 B2* | 10/2011 | Styles | F02B 47/08 | 123/568.12 |
| 8,302,583 B2* | 11/2012 | Nakatani | F02D 41/0062 | 123/305 |
| 2003/0116133 A1* | 6/2003 | Hertweck | F02B 1/12 | 123/431 |
| 2003/0196646 A1* | 10/2003 | Shoyama | F02D 13/0246 | 123/568.14 |
| 2003/0225503 A1 | 12/2003 | Mazur | | |
| 2004/0242436 A1* | 12/2004 | Ryan, III | C10M 169/04 | 508/382 |
| 2005/0061303 A1 | 3/2005 | Kuzuyama | | |
| 2005/0188954 A1* | 9/2005 | Yoshino | F02D 35/025 | 123/406.29 |
| 2006/0005819 A1 | 1/2006 | Barba et al. | | |
| 2007/0169748 A1* | 7/2007 | Nakayama | F02D 35/02 | 123/435 |
| 2007/0227517 A1* | 10/2007 | Casal Kulzer | | 123/568.14 |
| 2008/0022972 A1* | 1/2008 | Shimo | F02D 41/005 | 123/445 |
| 2009/0095250 A1* | 4/2009 | Kuzuyama | F02B 1/12 | 123/27 R |
| 2009/0126706 A1* | 5/2009 | Shimoda | F01L 9/02 | 123/568.12 |
| 2009/0266345 A1* | 10/2009 | Sasaki | F02D 13/0261 | 123/568.22 |
| 2010/0024787 A1* | 2/2010 | Chi | F02D 41/1401 | 123/568.11 |
| 2010/0043762 A1* | 2/2010 | Weiss | F02D 13/0219 | 123/568.14 |
| 2010/0115945 A1* | 5/2010 | Nakatani | F02D 41/0062 | 60/602 |
| 2010/0131181 A1* | 5/2010 | Herrmann | F02M 26/48 | 701/108 |
| 2010/0286930 A1* | 11/2010 | Onishi | F01N 3/021 | 702/24 |
| 2010/0300069 A1* | 12/2010 | Herrmann | F02D 41/146 | 60/274 |
| 2013/0092135 A1* | 4/2013 | Porten | F02M 26/46 | 123/568.11 |

FOREIGN PATENT DOCUMENTS

| | | | |
|---|---|---|---|
| DE | 102004038389 A1 | 3/2006 | |
| DE | 102005002246 A1 | 7/2006 | |
| DE | 102006014996 A1 | 10/2007 | |
| DE | 102008022644 A1 | 11/2009 | |
| DE | 112007003446 A5 | 3/2010 | |
| EP | 1041262 A2 | 10/2000 | |
| EP | 1537321 A1 | 6/2005 | |
| EP | 1790840 A1 | 5/2007 | |
| JP | S59-147838 A | 8/1984 | |
| JP | 2005-155603 A | 6/2005 | |
| JP | 2005-273513 A | 10/2005 | |
| JP | 2006-226205 A | 8/2006 | |
| JP | 2006226205 A * | 8/2006 | |
| JP | 2007-162527 A | 6/2007 | |
| JP | 2007270841 A | 10/2007 | |
| JP | 2007-315230 A | 12/2007 | |
| JP | 2007315230 A * | 12/2007 | ......... F02D 13/0261 |
| JP | 2008-025374 A | 2/2008 | |
| JP | 2008-121593 A | 5/2008 | |
| JP | 2008-309031 A | 12/2008 | |
| WO | 2005045219 A1 | 5/2005 | |
| WO | 2006076954 A1 | 7/2006 | |
| WO | WO 2007136142 A1 * | 11/2007 | ............. F02D 13/02 |
| WO | 2008131788 A1 | 11/2008 | |
| WO | 2008131789 A1 | 11/2008 | |
| WO | 2009017566 A1 | 2/2009 | |

* cited by examiner

NOX ADJUSTMENT CONTROL WITH INTERNAL AND EXTERNAL EXHAUST GAS RECIRCULATION

CROSS-REFERENCE TO RELATED APPLICATIONS

This application claims priority to German Patent Application DE 10 2010 056 514.8 having a filing date of Dec. 31, 2010, which is incorporated in its entirety herein by reference.

FIELD OF THE INVENTION

The invention relates to a method for reducing nitrogen oxide emission in a diesel engine, wherein at least a portion of an exhaust gas is recirculated to a combustion chamber by means of an internal exhaust gas recirculation into a combustion chamber. The invention further relates to an internal combustion engine, particularly a diesel engine, with at least one internal exhaust gas recirculation.

BACKGROUND OF THE INVENTION

A requirement for internal combustion engines, particularly diesel engines is that the limit values of nitrogen oxide emission be respected, wherein decreasing legal limit values requires a reduction of said nitrogen oxide emissions. One possibility of reducing nitrogen oxide emissions is to recycle portions of an exhaust gas into the combustion chamber, which makes it possible to set an oxygen concentration in the combustion chamber of the cylinder. This so-called exhaust gas recirculation, (EGR) represents the possibility of reducing the oxygen concentration in the combustion chamber of the cylinder. For this purpose, the precise setting of the oxygen concentration in the cylinder is of central importance during a transient or stationary operation. While a stationary operation of an internal combustion engine does not entail more stringent requirements in terms of adjustment control, an exhaust gas recirculation must be determined as precisely as possible during transient operation to be able to represent a good correlation of the nitrogen oxide emission. In exhaust gas recirculation, a distinction is made between internal and external exhaust gas recirculation. Internal exhaust gas recirculation consists of the return flow of exhaust gas out of the outlet channel into the combustion chamber during a valve overlapping phase. Here, the level of the internal exhaust gas recirculation depends on a pressure difference between fresh air feed and the exhaust gas system, the duration of valve overlapping, and the opening cross sections cleared by the valves. By a targeted variation of the valve overlapping, the internal exhaust gas recirculation can be optimized for the given load and operating conditions. For example, if it is possible to influence the valve lifting by means of a phase adjuster, then the internal exhaust gas recirculation becomes adjustable. Another known exhaust gas recirculation consists of external exhaust gas recirculation. Here, high-pressure exhaust gas recirculation, which allows a direct recirculation of the exhaust gases in the area of the exhaust gas manifold into the fresh air feed of the inlet channel, is distinguished from low-pressure exhaust gas recirculation, wherein the exhaust gas is diverted behind a turbine integrated in the exhaust gas system, and fed to the fresh air feed even before the charging.

One possibility for controlling the internal exhaust gas recirculation is described in DE 34 01 362 A1. A variable valve control method is described, whereby the inflow and outflow of the work medium can be controlled. Such a flexible control offers the advantage that, during stationary operation of the internal combustion engine, the feed of the work medium can be adjusted to the different operating states. As a result of an appropriate control of the inlet and outlet valves, the exhaust gas quantity in the cylinder is increased, so that the remaining cylinder volume is lowered to suction fresh mixture. Due to the lower suctioned fresh mixture quantity, the load is reduced. This procedure can be considered up to approximately half the maximum load. A further lowering of the load can be achieved by reducing the exhaust gas quantity remaining in the combustion chamber from the previous work cycle, by means of appropriate control times of the inlet and outlet valves at the upper dead point, and also due to the reduction of the fresh air quantity reaching the combustion chamber, by means of appropriate control times for the inlet valve. Using a variable valve timing, (VVT), a possibility is provided for adjusting an internal exhaust gas recirculation. The content of this printed document in relation to VVT is included here in its entirety in the disclosure of the invention.

An adjustment control to minimize a nitrogen oxide emission in the exhaust gas of an internal combustion engine is disclosed in WO 2008/131788. A method is disclosed in which to set nitrogen oxide emissions where nitrogen oxide values in the exhaust gas of the internal combustion engine are monitored and set in correlation with a nitrogen oxide limit value, and the combustion adjustment control, on the basis of values of the nitrogen oxide adjustment control, carries out an adaptation of the nitrogen oxide adjustment control, for the purpose of respecting the nitrogen oxide limit value. Besides virtual values of an air consumption, an exhaust gas recycle rate, and an oxygen quantity proportion, measured quantities, as well as quantities taken from characteristics fields of a substance, quantitative proportion of nitrogen oxides are also incorporated in the calculation of a particle concentration in the exhaust gas and of a virtual substance quantitative proportion of nitrogen oxides in the exhaust gas. To determine the nitrogen oxide proportions in the exhaust gas, a nitrogen oxide sensor is used, whose determined value is used in an adjustment control unit for the adjustment control of an exhaust gas recycle valve. The disclosure of this printed document is also included in its entirety in the disclosure of the invention, particularly with regard to the external exhaust gas recirculation as well as the modeling.

An additional possibility of influencing the nitrogen oxide proportions in the exhaust gas of an internal combustion engine is disclosed in WO 2008/131789. An adjustment control system is disclosed for regulating the exhaust gas recycle rate by means of a virtual nitrogen oxide sensor with an adaptation via a nitrogen oxide sensor. To take into account a delay by means of a nitrogen oxide sensor, a first adjustment control means, which simulates a virtual nitrogen oxide sensor, a second adjustment control means carries out an adapted adjustment control of the virtual nitrogen oxide sensor, and a third adjustment control agent implements the nitrogen oxide adjustment control, wherein the first adjustment control is constructed in such a manner that the virtual nitrogen oxide sensor establishes a presetting for the first adjustment control. Due to the disclosed method, an adjustment control of an exhaust gas recirculation mass flow becomes possible, where using an exhaust gas recirculation mass flow as adjustment control variable is preferred. By setting the exhaust gas recirculation mass flow, an oxygen content in the suction pipe of the internal combustion engine is set. A virtual nitrogen oxide sensor analyzes a virtual oxygen content, which is corrected by an adapted value, thus allowing the derivation of a virtual nitrogen oxide value in the exhaust gas. Besides the known acquisition and calculation alone of a nitrogen oxide value, a temporal delay in the acquisition of a nitrogen oxide sensor is taken into account by means of a model-based calculation of a nitrogen oxide value. This printed document is also included in its entirety in the disclosure of the invention, particularly with regard to the modeling and adjustment control.

The problem of the invention is to make possible an improved exhaust gas behavior of an internal combustion engine over an operating range, wherein a rapid adjustment control is made possible.

SUMMARY OF THE INVENTION

This problem is solved in relation to the method by claim 1 and in relation to the internal combustion engine according to claim 12. Further advantageous embodiments can be obtained from the respective dependent claims. However, the individual characteristics in the claims are, not limited to said embodiments, and they can also be combined with other characteristics from the description below, as well as from the dependent claims, to additional embodiments.

A method is proposed for reducing a nitrogen oxide emission in a diesel engine; in which at least one portion of exhaust gas of an in engine combustion is segmented in the combustion chamber as follows;

A first portion of exhaust gas enters as an internal exhaust gas recirculation from the combustion chamber of the diesel engine via an outlet valve associated with the combustion chamber, and is recirculated, via the outlet valve from the subsequent exhaust gas tract into the combustion chamber of the diesel engine, A second portion of exhaust gas remains in the combustion chamber and is not expelled, A third portion of exhaust gas is recirculated as external exhaust gas recirculation via an exhaust gas recirculation valve into the combustion chamber, and The respective portions of exhaust gas together form a residual exhaust gas in the combustion chamber for a combustion work step, the residual gas and/or at least one ratio between portions of the exhaust gas in the combustion chamber is set.

The method for reducing a nitrogen oxide emission in a diesel engine, in which at least a portion of an exhaust gas of a combustion is recirculated into a combustion chamber by means of an internal exhaust gas recirculation, which provides, according to a first variant that in a first process step at least one physical variable, particularly a temperature or a pressure of the residual exhaust gas is determined, and, in an additional process step a density of the residual exhaust gas as well as a mass of the residual exhaust gas is determined. In this manner, it is possible, to subsequently determine and preferably control, a feed of fresh air into the combustion chamber and/or an oxygen concentration in the combustion on the basis of the calculated mass of the residual exhaust gas. If the internal combustion engine is still in the starting phase, then the mass of the residual exhaust gas can also be preset according to an embodiment. For example, it is possible to have recourse to a characteristic field, from which the value can be taken depending on other parameters. Said parameters can be one or more of the following groups: fuel characterization, temperature of the environment, oil temperature of the internal combustion engine, environmental pressure, air humidity, and state of an exhaust gas purification installation.

Due to the determination of the mass of the residual gas, a possibility is created to determine and preferably control, in each case a fresh air feed into the combustion chamber and/or an oxygen concentration in the combustion chamber taking into account known geometric dimensions of the combustion chamber. From the known geometric dimensions of the combustion chamber a portion of the cylinder, which is available for feeding and removing a work medium, and knowing the mass of the residual exhaust gas present in the combustion chamber, it is possible to calculate a fresh air feed and/or oxygen concentration in the combustion chamber. A fresh air feed and/or oxygen concentration in the combustion chamber can thus be determined very precisely, taking into consideration a residual exhaust gas, and it can be adjusted for the given operation, particularly for a transient or a stationary operation.

An exhaust gas recirculation on the basis of a measurement of a nitrogen oxide proportion in the exhaust gas by means of sensors can also be taken into consideration, particularly as evident from the above state of the art, preferably in combination with the proposed procedure.

In an additional embodiment, an immediate setting of the fresh air feed and/or oxygen concentration in the combustion chamber is still possible, even in the same and/or in the following work step. In the transient region in particular, this allows an adaptation of the composition of the residual exhaust gas as well as of the feed of fresh air, adapting to the current conditions of the change in fuel feed, particularly a change in injection. If the substantial composition of the residual exhaust gas occurs via the internal exhaust gas recirculation, exclusively via a phase position of the valve lifting, then the internal exhaust gas recirculation can be a measure for the fresh air feed, and thus a control variable for a nitrogen oxide emission of the internal combustion engine. An adjustment control of a nitrogen oxide proportion is also possible if an internal combustion engine is operated with fixed phase positions of the inlet and outlet valves. As a function of the mass of residual exhaust gas, which is determined or calculated, a fresh air feed through an inlet valve and thus an oxygen concentration in the combustion chamber of the cylinder can be adjusted. The possibility exists to correct the volume to be filled with fresh air in the combustion chamber, for example, as a function of the first portion of the residual exhaust gas with respect to the internal exhaust gas recirculation, so that a precise cylinder filling as well as the composition thereof for a transient operation can be calculated.

In particular, the determination of the residual exhaust gas in the combustion chamber for a combustion work step enables a precise setting of an oxygen concentration in a respective combustion chamber of a cylinder of an internal combustion engine, preferably in the transient, but also in the stationary operation. According to an embodiment, the method is used for each combustion chamber of a multi-cylinder internal combustion engine. The method can be used permanently. According to another embodiment, it is also possible to use the method only transiently. For example, the method can be used in transient operating ranges of the internal combustion engine, in the acceleration and in the braking operation. The method can also be used in the start phase of the internal combustion engine. Setting an oxygen concentration, and thus reducing a nitrogen oxide emission, is advantageous in the transient and the start operation, particularly for complying with the required exhaust gas values.

In an additional embodiment of the invention, a first temperature of fresh air for the combustion chamber is determined, as well as a second temperature of the residual exhaust gas, and, by means of a processing unit, a model for the determination of an ignition delay is calculated, and at least on the basis of the first and the second temperature of the fresh air and of the residual exhaust gas, a cylinder filling temperature is calculated. In a variant, a distribution of a ratio of the first part and the second part of the residual exhaust gas is derived from a cylinder filling temperature, preferably the calculated cylinder filling temperature, the ratio is adjusted. In an additional embodiment, at least one or several portions of the residual exhaust gas and/or one or more ratios of the proportions of the residual exhaust gas to each other are preset as target value in an adjustment control. Adjusting the first portion of the residual exhaust gas and/or the third portion of the residual exhaust gas is preferred.

For example, adjusting a portion of an internal and/or of an external recirculated exhaust gas for the determination of the residual gas is preferred. By means of a determination of a cylinder filling temperature, it is possible to influence the temperature directly in the combustion chamber, and to determine a target value of the mass of the residual exhaust gas. Particularly in the case where the internal combustion engine requires lower charges, so that low charging pressures exist, a high exhaust gas recirculation rate can lead to a very low compression end temperature, and thus to a very low compression pressure. These conditions together with a low oxygen concentration lead to poor ignition conditions. This results in long ignition delays, which lead to strongly elevated hydrocarbon and carbon monoxide emission, including ignition failures. It is thus not useful to increase the oxygen concentration or lower the exhaust gas recycle rate, in order to satisfy the required nitrogen oxide values. To respect the nitrogen oxide limit values, it is proposed to increase the hot internal exhaust gas recirculation. If a cylinder filling temperature is calculated by means of a model for calculating an ignition delay, it is possible to achieve an adjustment control for reducing a nitrogen oxide emission, by means of a distribution of a ratio of an internal and/or an external recirculated exhaust gas. Thus, depending on the charging and/or operating state of the internal combustion engine, more or less internal or external exhaust gas is recirculated into the combustion chamber.

An optimization of the method is thus achieved if, on the basis of the calculated ignition delay, a minimum compression end temperature associated with a maximum ignition delay duration is calculated, and a minimum cylinder filling temperature is calculated by means of the minimum compression end temperature, in order to reach the minimum compression end temperature. To achieve the minimum compression end temperature, it is preferred to determine and adjust a composition of an internal and/or an external recirculated exhaust gas. By means of an ignition delay, the combustion and thus the emission behavior of the internal combustion engine can be adjusted. If, as proposed, a maximum ignition delay duration and an associated minimum compression end temperature are calculated, it thus becomes possible to determine a cylinder filling temperature on the basis of the minimum compression end temperature. A setting of the minimum compression end temperature is thus adjustable via the adjustment control of the residual exhaust gas and particularly via a distribution of a composition of the residual exhaust gas. Thus, it is possible to set a temperature during the cylinder filling via a control of the feed of the proportions of internal and external recirculated exhaust gas. For example, a determinable target value of the mass of the residual exhaust gas, but also a determination of the first portion of the internal exhaust gas recirculation can influence a desired cylinder filling temperature, and determine it directly.

It is proposed that by means of a back calculated model of the ignition delay, a minimum admissible compression temperature is calculated, associated with a maximum admissible ignition delay duration. Subsequently, the minimum cylinder filling temperature is calculated, in order to reach the compression end temperature. From the temperature of the fed fresh air as well as the temperature of the residual exhaust gas, a distribution of the ratios of the first and third portion of the residual exhaust gas in the combustion chamber of the internal and the external exhaust gas recirculation, is determined, controlled and/or adjusted.

In an additional embodiment, a physical variable, particularly at least a temperature or a pressure, is used for the calculation of the ignition delay at a specific time, for example, at the time when an outlet valve of the engine closes. If, for the calculation of the ignition delay, a physical variable is used as a basis, which relates to the time when the outlet valve of the combustion engine closes, an actual value for a mass of the residual exhaust gas in the combustion chamber can be determined even more precisely, which in turn has a positive effect on setting of the oxygen concentration in the combustion chamber.

The physical variables for the calculation and adjustment control of the reduction of a nitrogen oxide emission can be available directly from a sensor and/or from available values, from characteristic fields, and/or as calculated quantities. Here, it is advantageous that at least a temperature or a pressure of a fed fresh air and/or of the residual exhaust gas is/are determined by means of a sensor and/or by means of available and/or calculated data. A determination of the temperature and/or pressure value as variables for the control of the nitrogen oxide emission by means of a sensor offers the advantage that concrete and actual states in the combustion engine are acquired. Long acquisition times may be disadvantageous in the case of sensors, so that, a more rapid control can optionally become possible, by means of available temperature and/or pressure variables from characteristic fields. This must be weighed and verified on a case by case basis. Calculated data offer the possibility of taking the data acquired by means of a sensor into account, and also available data, i.e., physical variables, from characteristic fields. For example, it is possible to use model-based quantities, and thus enable a direct adaptation of the control variable. The possibility also exists to take into account an actual course of the combustion in the adjustment control of the fresh air feed and/or of the oxygen concentration an adjustment control of the residual exhaust gas.

It is preferred that the composition of the residual exhaust gas, particularly the internal exhaust gas recirculation are controlled and/or adjusted by means of a variable valve control. If the method is carried out with a variable valve control with modifiable valve control times, then the internal exhaust gas recirculation can be precisely adjusted. For example, if a target residual exhaust gas mass is determined by means of an active internal exhaust gas recirculation, then a valve control time can be derived directly therefrom. Besides the influence on the combustion course in relation to a feed of fresh air, and an influence of the ignition delay, an additional possibility is thus generated to influence the nitrogen oxide emission of the engine. A precise determination of the active mass of the recirculated exhaust gas, for example, at the time when the outlet valve closes, again makes it possible to precisely determine a target residual exhaust gas mass, so that a target valve adjustment becomes adjustable.

According to an additional embodiment of the invention, the ratio of internal and/or external exhaust gas recirculation is determined by means of geometric cylinder data. A determination of the mass of the internal exhaust gas recirculation occurs on the basis of geometric dimensions of the cylinder, so that a target value for an internal exhaust gas recirculation can be precisely determined. If, for example, on the basis of the temperature and the pressure of the exhaust gas a density of the exhaust gas is determined, then it is possible to determine a precise mass of the residual exhaust gas in the combustion space by means of the geometric dimensions. If in the process the temperature and the pressure of the fed fresh air in the suction system and the suction manifold before the inlet valve is taken into account, then an exact determination of the mass or proportion of fresh air in the combustion chamber is possible. If the internal combustion engine is implemented with a variable valve adjustment, then, on the basis of the determined mass of residual exhaust gas in the combustion chamber as well as of a determined compression end temperature, an exact target exhaust gas recycle mass can be determined for subsequent cylinder fillings during the next work step. From the target residual exhaust gas mass it is possible to directly derive, for example, a valve control time. Taking into consideration an operating state, i.e., a transient or stationary operation, the mass of the residual exhaust gas can be determined.

An internal combustion engine is proposed, particularly a diesel engine, in which the method is implemented, as described above. For example, the internal combustion engine comprises a fresh air feed for each combustion chamber, particularly a variable valve driving to implement an internal exhaust gas recirculation, at least one exhaust gas recirculation valve, at least one device for the determination of the temperature and of a pressure of the residual exhaust gas and/or of a portion thereof, and a processing unit, where the processing unit comprises at least a model for the calculation of an ignition delay as well as for the determination of a density and a mass of the residual exhaust gas, and determines a fresh air feed, preferably for each combustion chamber, on the basis of the calculated mass of the residual exhaust gas.

By means of the fresh air feed, the oxygen concentration in the combustion chamber, which was determined by means of the method by determining at least the residual exhaust gas for the respective working point, is achieved.

Thus, the possibility is created to set the oxygen concentration to a transient or to a stationary operation of the internal combustion engine. During the filling of the combustion chamber of a cylinder, the feed mass flow and/or the mass flow is/are influenced, which also flows from the waste recirculation valve(s) into the combustion chamber, wherein an inlet valve of the combustion chamber can be used for that purpose. The external exhaust gas recirculation can alternatively also take place independently of the inlet valve, via its own inlet to the combustion chamber. The feed flow into the combustion chamber is controlled in such a manner that an exact oxygen concentration can be set on the basis of the determined need by means of the determined mass of the residual exhaust gas present in the combustion chamber.

An embodiment of the internal combustion engine presents an internal exhaust gas recirculation, which is settable by means of a variable valve adjustment. A variable valve adjustment makes it possible to control and adjust, beyond the exclusive adjustment control of the fresh air feed for the determination of the oxygen concentration, the oxygen concentration immediately via a phase adjustment of the outlet or inlet valve. Depending on the operational state of the internal combustion engine, different phase positions of the valves on the internal combustion engine are settable. For example, if an elevated nitrogen oxide emission is detected or calculated, in relation to a transient operation of the motor vehicle, it is possible to directly influence the oxygen concentration in the combustion chamber. By means of a determination of the mass of the internal exhaust gas recirculation, a fresh air feed can be adjusted directly. The internal exhaust gas recirculation, adjusted via the variable valve timing, is settable on the basis of the calculated masses in the combustion chamber in relation to a preset value for a target exhaust gas recirculation mass, so that for subsequent combustion cycles, a target exhaust gas recirculation rate and a corresponding valve opening or overlapping time can be predetermined.

By means of an adjustment control of a ratio of an internal and an external exhaust gas recirculation, it is possible to set an oxygen concentration in the combustion chamber, and to influence an ignition delay. For example, if, on the basis of a low oxygen concentration, a poor ignition condition is determined, then a temperature in the combustion chamber can be increased by means of an increase in the internal exhaust gas recirculation, namely in such a manner that a compression end temperature can be achieved, which in turn ensures better ignition conditions. Thus, it is possible to improve the emission behavior of the internal combustion engine directly via the internal exhaust gas recirculation. An additional influence on the mass of the residual exhaust gas can be achieved by the fact that the exhaust gas recirculation can be implemented as a low-pressure and high-pressure exhaust gas recirculation. By means of a high-pressure exhaust gas recirculation it is again possible to raise a temperature of a mixture more rapidly with the fed fresh air, so that the ignition behavior can in turn be briefly influenced. A low-pressure exhaust gas recirculation again provides for a cooler temperature of the mixture with fresh air composition.

In order to influence a temperature in the combustion chamber further, the external exhaust gas recirculation can be a cooled or a not cooled exhaust gas recirculation. If a cooled exhaust gas mass flow is admixed to the fresh air, the result is a lower temperature in the combustion chamber. If then, using an assumed or acquired temperature of the fresh air, and the known or required temperature of the residual exhaust gas, a mass of residual exhaust gas in the combustion chamber is determined, then an additional possibility is created by means of the cooled gas recirculation to influence the ignition behavior, and thus the emissions of the internal combustion engine.

BRIEF DESCRIPTION OF THE DRAWINGS

Additional embodiments of the invention are apparent from the following figures. However, the embodiments of the figures should not be interpreted to limit the invention. Rather, they serve for explanation. One or more characteristics of an embodiment of the following figure can be combined with one or more characteristics from other embodiments of the figures as well as from the above description to additional combinations of the invention. The figures show.

DETAILED DESCRIPTION OF THE INVENTION

Figure 1:
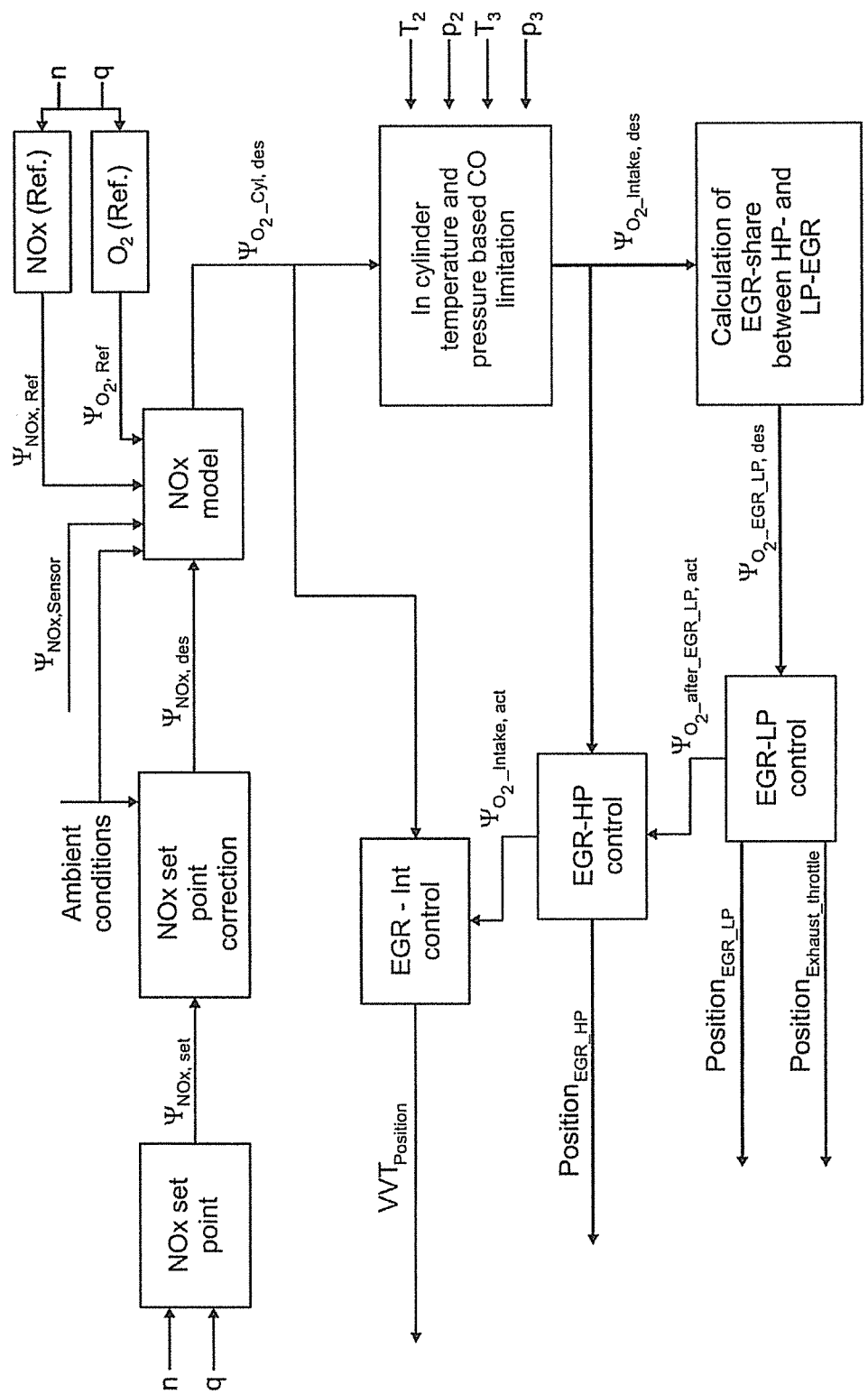
FIG. 1, a first embodiment of a control diagram.

FIG. 1 shows an example of a diagrammatic view of an internal combustion engine, particularly in relation to an implementable process scheme for an internal combustion engine, in which a high-pressure and a low-pressure path EGR-HP, EGR-LP for an exhaust gas recirculation is present and taken into account. For this purpose, a desired O2 concentration is determined for each path of the exhaust gas recirculation. The O2 concentration can contain a percentage proportion of the air contained in the combustion chamber, unless the indication is made in volume percent, or the indication may be stoichiometric, or another value may be used, particularly one in relation to the combustion chamber. The model presented in FIG. 1 provides for the entry of at least one reference value for O2 as well as for NOx in relation to the given concentration as well as a recorded NOx value is entered into an NOx model by means of a sensor, preferably a lambda sensor. Moreover, set points can be established, based on the operating conditions in which the internal combustion engine is represented by value examples, such as, the rpm n of the crankshaft and the delivered or generated torque q. Said requirements can be taken, for example, from one or more characteristic fields. Thus, a value of a concentration of NOx can be used, for example, where said concentration value can be adapted by the influence of the environmental conditions. Moreover, the respective reference value for the concentration of NOx or O2 can be set via the operating state of the internal combustion engine. The NOx model is then capable of establishing, for example, an oxygen concentration which enters as a single value in an exhaust gas control. This oxygen concentration enters into a verification to determine whether the resulting cylinder temperature with said oxygen concentration, a predetermined CO limitation can be maintained. For this purpose, the pressure or the temperature, which is determined or given over a 4 work step cycle, particularly one combustion cycle, is also taken into account. From this, a desired oxygen concentration is then derived. The latter enters into the adjustment control or control in relation to, for example, the high-pressure path of the exhaust gas recirculation, and, on the other hand, into a calculation of the exhaust gas recirculation distribution between the high-pressure and the low-pressure exhaust gas recirculation path. From this, an oxygen concentration for the low-pressure path can be determined, which again has an effect in the determination of the position of the low-pressure exhaust gas recirculation valve or an outlet valve. The so determined value of the oxygen concentration enters into the adjustment of the high-pressure exhaust gas recirculation. Together with the oxygen concentration, which is desired, this adjustment control can then determine an inlet oxygen concentration, which in turn can lead via the exhaust gas internal adjustment control, to a special positioning or actuation of the variable valves of a variable valve operation. The position of the high-pressure exhaust gas recirculation valve and the corresponding control time for the opening and the closing is established. In this manner, it is possible that the different portions of the residual gas, the first portion of the exhaust gas, which enters into the combustion chamber as internal exhaust gas recirculation, the second portion of the exhaust gas, which remains in the combustion chamber and is not expelled, as well as the third part of the exhaust gas, which is recirculated as external exhaust gas recirculation via an exhaust gas recirculation valve into the combustion chamber, can be determined and set, wherein the oxygen concentration in the combustion chamber is used for this purpose, so that it is possible to set therefrom a reduction of a nitrogen oxide emission, particularly in the diesel engine.

Figure 2:
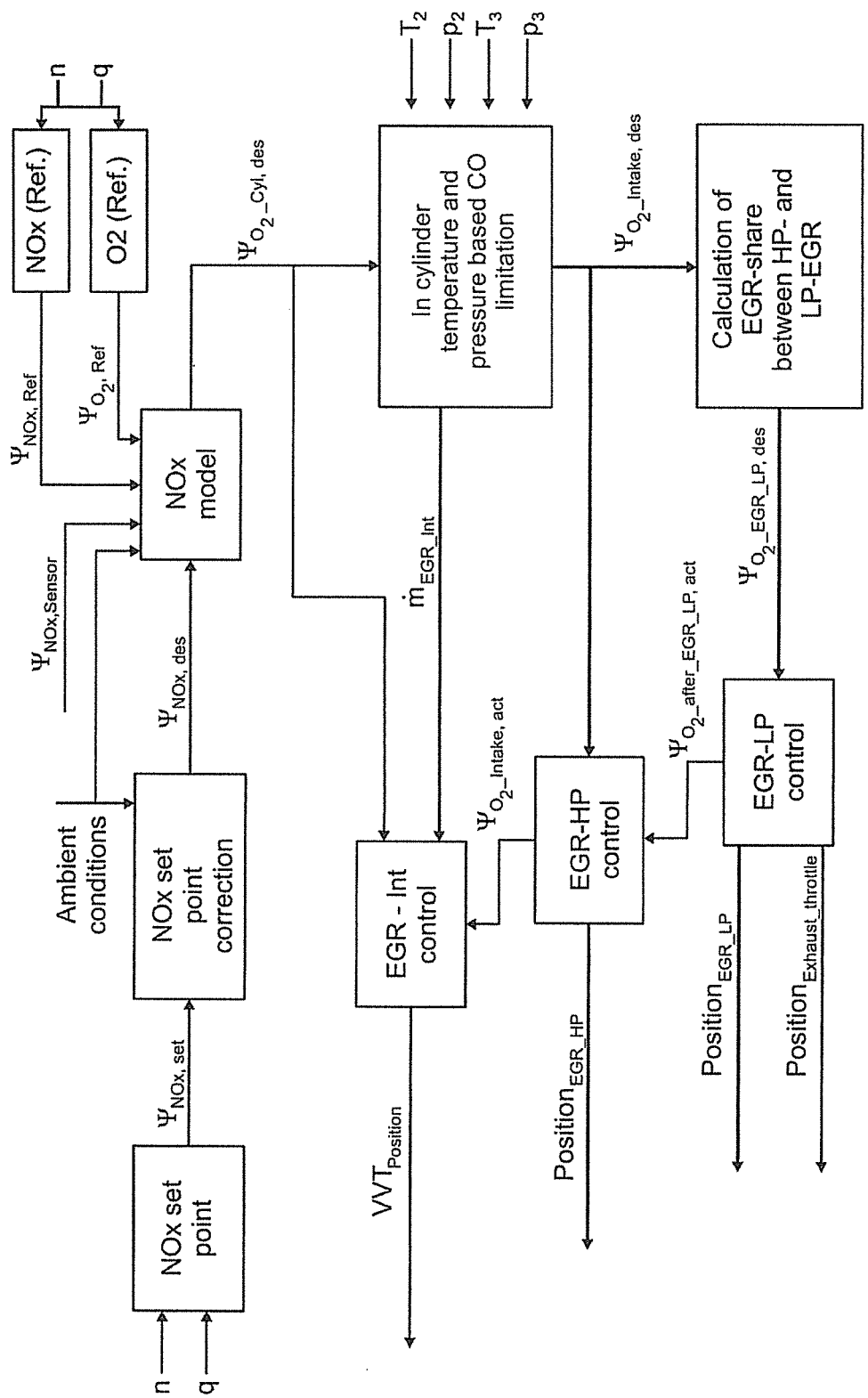
FIG. 2, an enlargement of the first control diagram.

FIG. 2 shows a variant of the combustion scheme, as one can see in FIG. 1. Here, during the operation of the diesel engine, the temperature and the pressure in the combustion chamber are determined, and, moreover, a density of the residual exhaust gas and from this a mass of the residual exhaust gas can be calculated. For this purpose, it is shown that an exhaust gas mass flow enters into the exhaust gas recirculation control or adjustment control, which is obtained, as internal exhaust gas mass flow, on the basis of the determined oxygen concentration from the NOx model, taking into consideration the firing of the combustion chamber, and the resulting limitation with regard to pressure, temperature and CO.

Figure 3:
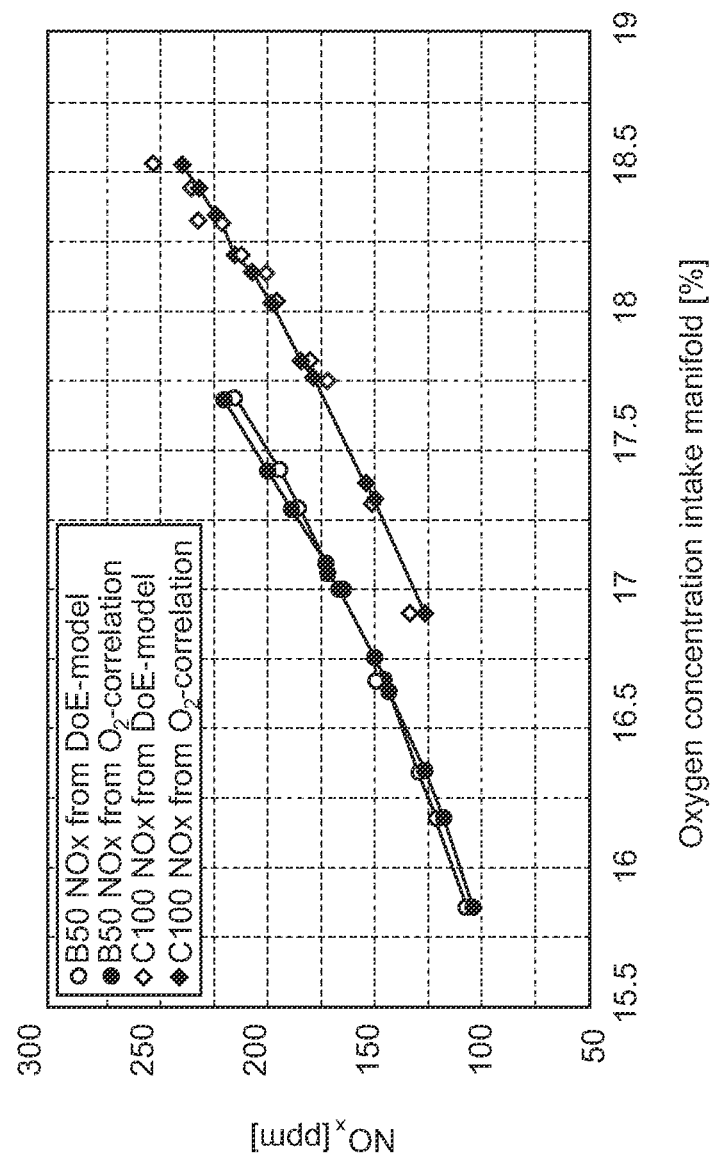
FIG. 3, a relation between oxygen and NOx concentration.

FIG. 3 shows a design example of a possible relation between oxygen and NOx concentration, as used, for example, in an NOx model. On the y axis, an NOx value is plotted, and on the x axis, an oxygen concentration in the inlet. The NOx module is used, because a reaction of an NOx sensor may be too slow to be able to allow the input of the resulting determined NOx determination in an NOx adjustment control. Therefore, it is proposed, for example, to use an NOx model, which uses a correlation. As represented, for this purpose, a correlation can be used between the concentration of NOx, on the one hand, and an oxygen concentration, on the other hand, wherein an exponent k is also used. The exponent k may remain constant for the operating range of the internal combustion engine. By means of a preliminary determination, a correlation can thus be used and set, which can then be used in the process scheme in the context of the modeling.

Figure 4:
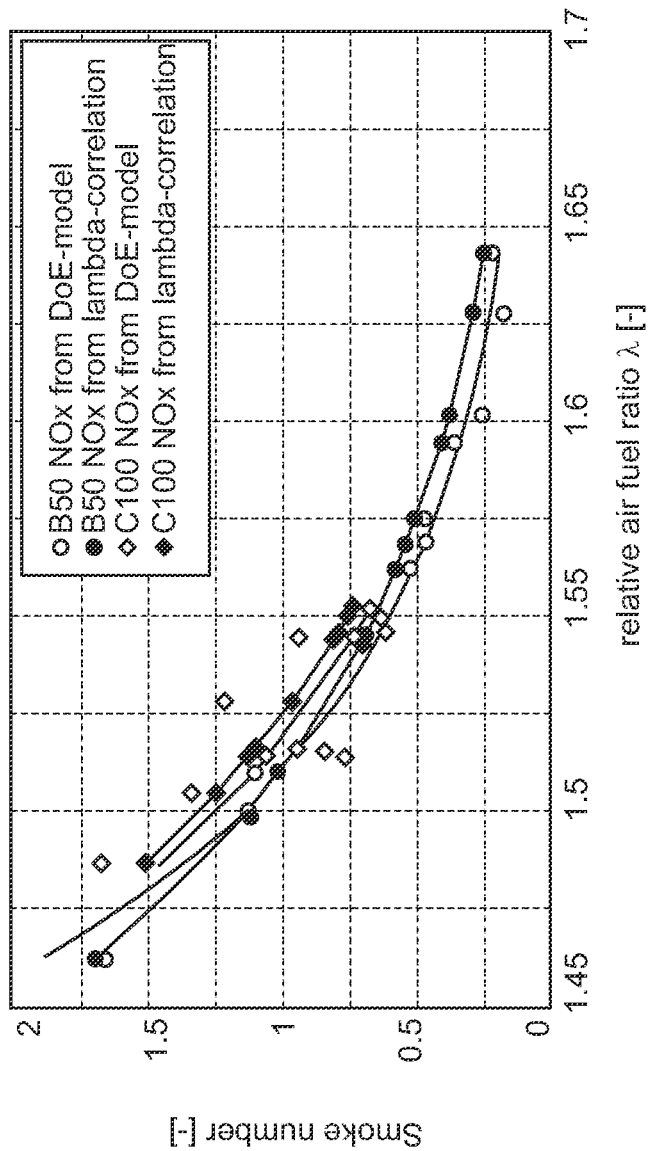
FIG. 4, the possibility of taking unburned carbon into consideration.

FIG. 4 shows an additional relation which can enter into the process scheme. Here, the possibility to take unburned carbon into account is provided. An unburned carbon sensor as such is not provided here. Nonetheless, the influence of unburned carbon is also to be determined. For this purpose, for example, an unburned carbon number is represented on the y axis, while the air/fuel ratio is reproduced on the x axis. Then, from measurements, a correlation can be established, as represented in an example. Such a correlation can then also be taken into account in the further design of the method.

Figure 5:
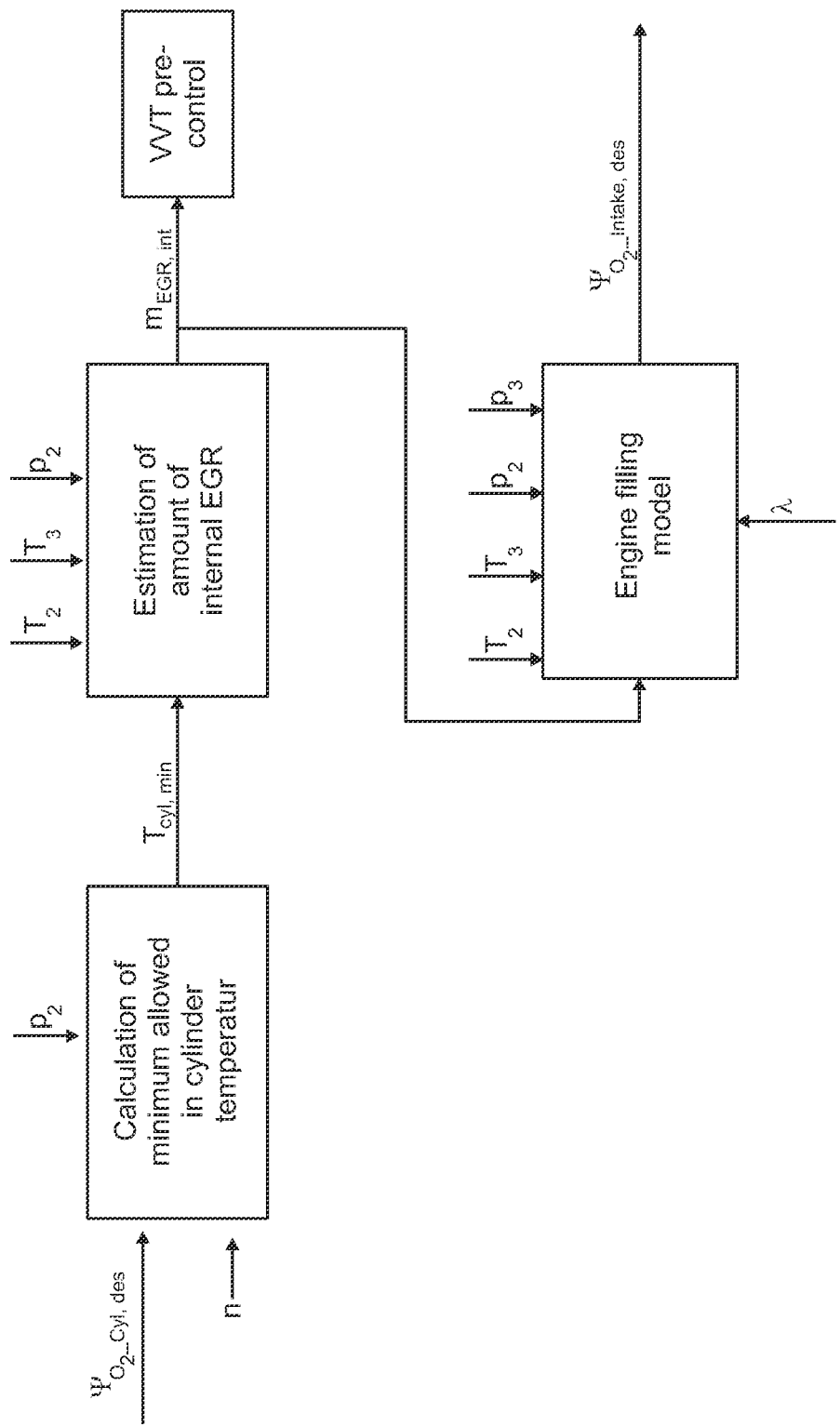
FIG. 5, a possibility of determining a distribution between an internal and an external exhaust gas recirculation, FIG. 6, an addition to the determination of the ratio between the low-pressure and the high-pressure exhaust gas recirculation, FIG. 7, a variant showing diagrammatically how the method can be designed, FIG. 8, a design example of a model-based preliminary control for the high-pressure exhaust gas recirculation, FIG. 9, an overview example of a control strategy taking into account a low-pressure exhaust gas recirculation, FIG. 10, an addition to the representation in FIG. 1 or FIG. 2.

FIG. 5 shows a possibility, as an example, of how a distribution can be determined between an internal and an external exhaust gas recirculation. Thus, for example, the calculation of a minimum temperature in the combustion chamber is made possible because the associated pressure value, a desired oxygen concentration, but also the current state of the internal combustion engine can also be taken into account in relation to the current working point. From this, the minimum temperature can be determined, and then it can be used for the purpose of estimating the internally recirculated exhaust gas, using the temperatures or the pressure. On this basis, a preliminary control can then be carried out, using, for example, a variable valve timing, and a filling model for one or more cylinders can be operated. The filling model then has the possibility of again being able to determine a desired feed oxygen concentration, which can then be used further in the process.

Figure 6:
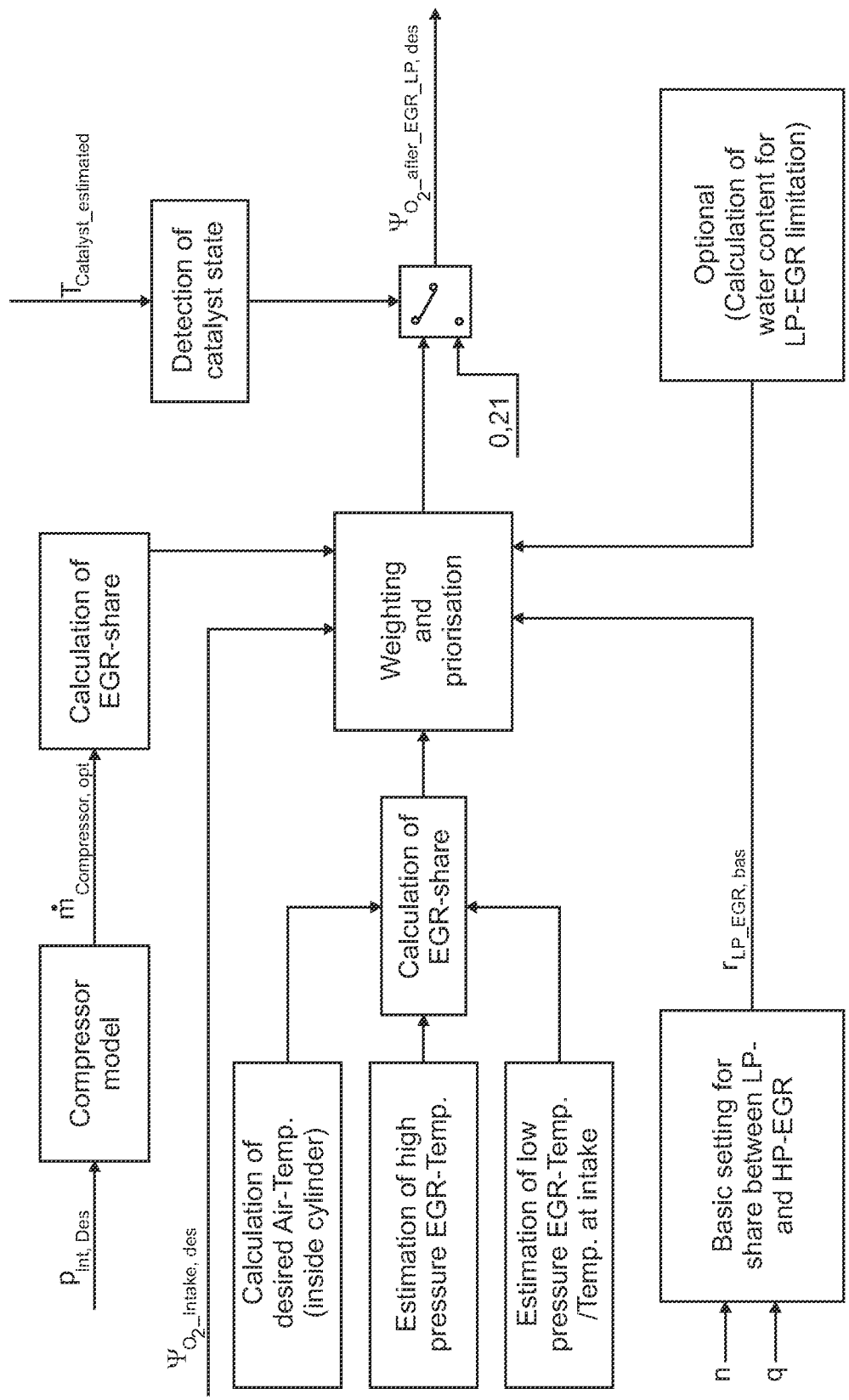

FIG. 6 then shows an additional addition to the determination of the ratio between the low-pressure and the high-pressure exhaust gas recirculation. Here, for example, the concentration value of oxygen determined in FIG. 5 is used, in order to be able to use said value in an evaluation and priorization tool. For example, it is provided that here too one includes the fact that there is charging in the internal combustion engine. For this purpose, a compression model is provided, wherein, via the desired pressure, for example, an optimally compacted mass flow is determined. This can then enter into a calculation of the distribution of the exhaust gas recirculation ratios. This too is then taken into consideration in the context of the weighting and prioritization. Moreover, a calculation of the exhaust gas recirculation ratio is made possible, by a calculation of a desired air temperature inside the cylinder, by an estimation of the exhaust gas recirculation temperature in the high-pressure path, and also by an estimation of a temperature of the exhaust gas recirculation in the low-pressure path or a temperature at the inlet. Together they can also be used in a step of a calculation of the distribution of the waste-gas recirculation ratio. Moreover, basic values are set on the basis of the current working point of the internal combustion engine, for the high-pressure or low-pressure exhaust gas recirculation path, which also enter into the weighting and prioritization. Optionally, it is also possible to provide that, for example, an H2O content, particularly from the low-pressure exhaust gas recirculation path, also enters in the form of a limiting value, into the weighting and prioritization. The value or values determined therein then enter into a processing, in which a conclusion regarding the state of the catalyst is drawn, via an estimated temperature of a catalyst device. Moreover, it is possible to decide whether and how an oxygen concentration is used as a desired value, which is then further used. Here, it is also possible to provide that the process decides that a predetermined stoichiometric value of the oxygen concentration should be used.

Figure 7:
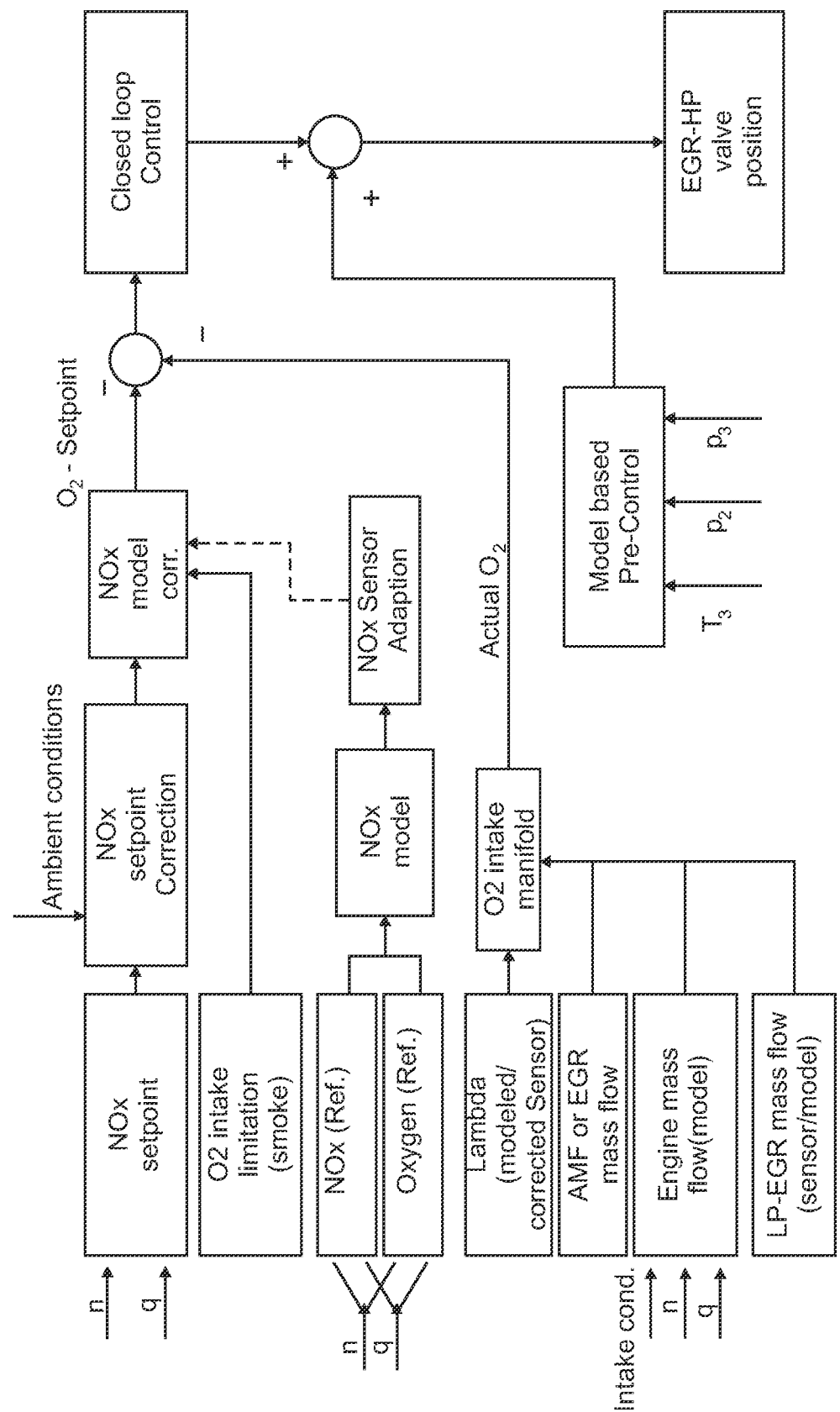

FIG. 7 shows a variant indicating how the process can be designed diagrammatically. On the basis of the establishment of conditions at the working point, particularly, for example, of the rpm n or the delivered or the desired torque. Different values for the method can be predetermined, or they can be determined from tables or other storage possibilities. Values that were determined, for example, in the previously described process runs can also be used here. In this manner, via an NOx determination and correction, an oxygen value can be determined, which in turn can be compared with the currently determined oxygen value. The latter in turn can enter into an adjustment control loop, wherein on the basis of a preliminary adjustment control, which is based on a model, and into which the corresponding pressure or temperature values of the cylinder enter, a position of the exhaust gas recirculation valve in the high-pressure exhaust gas path can then be determined.

Figure 8:
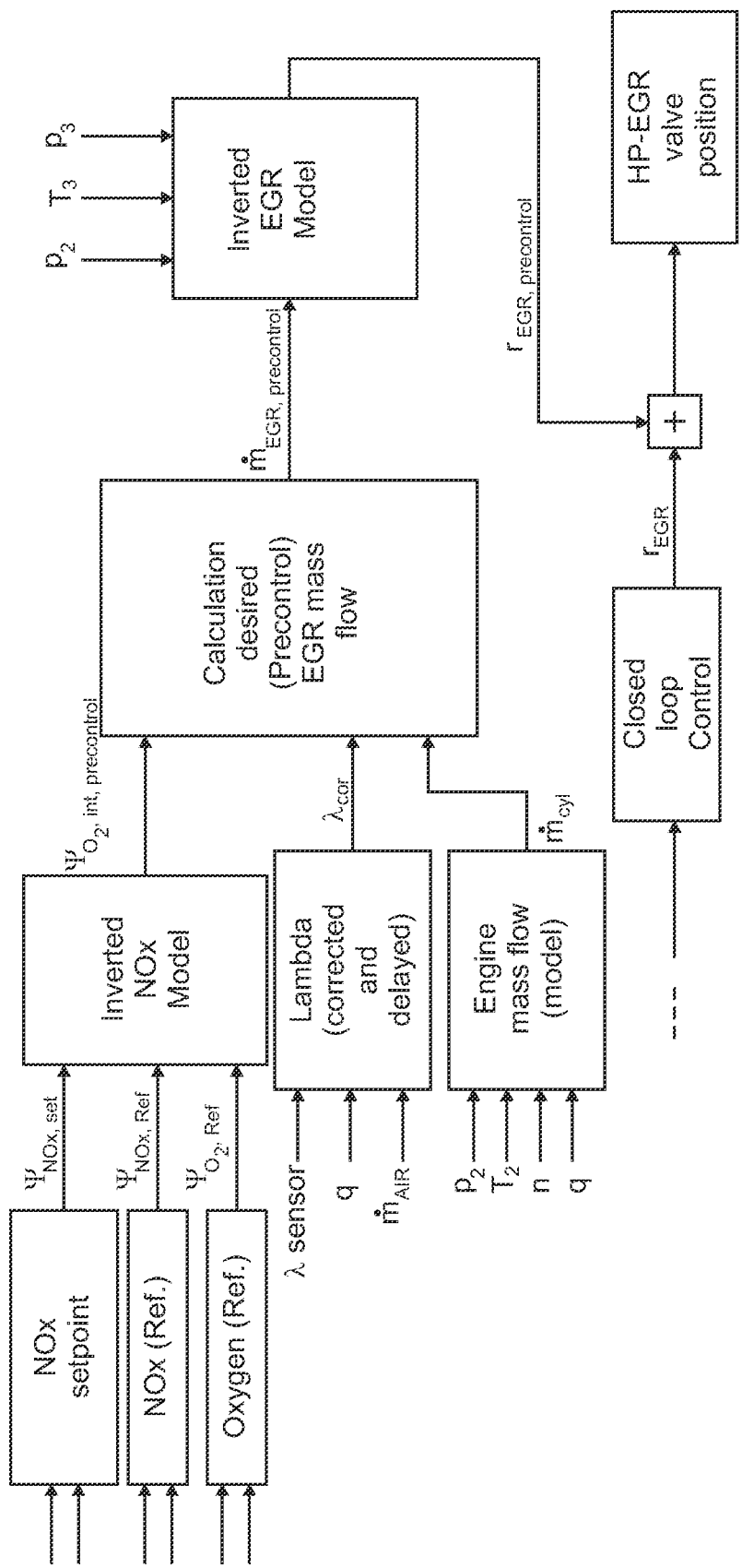

FIG. 8 shows an embodiment example of a model-based preliminary control for the high-pressure exhaust gas recirculation. Via the various values that enter in the different models, a preliminary determination of an exhaust gas recirculation mass flow can be generated, to determine an oxygen concentration, an adapted lambda value as well as a mass flow. Again, an inverted exhaust gas recirculation model can be considered, taking into consideration temperatures and pressures in the cylinder. From this, in turn, the ratio of high-pressure or low-pressure exhaust gas recirculation can be determined, and enter into an adjustment control. In the context of the adjustment control, it is then possible to draw a conclusion regarding the valve position of the exhaust gas recirculation valve in the high-pressure path.

Figure 9:
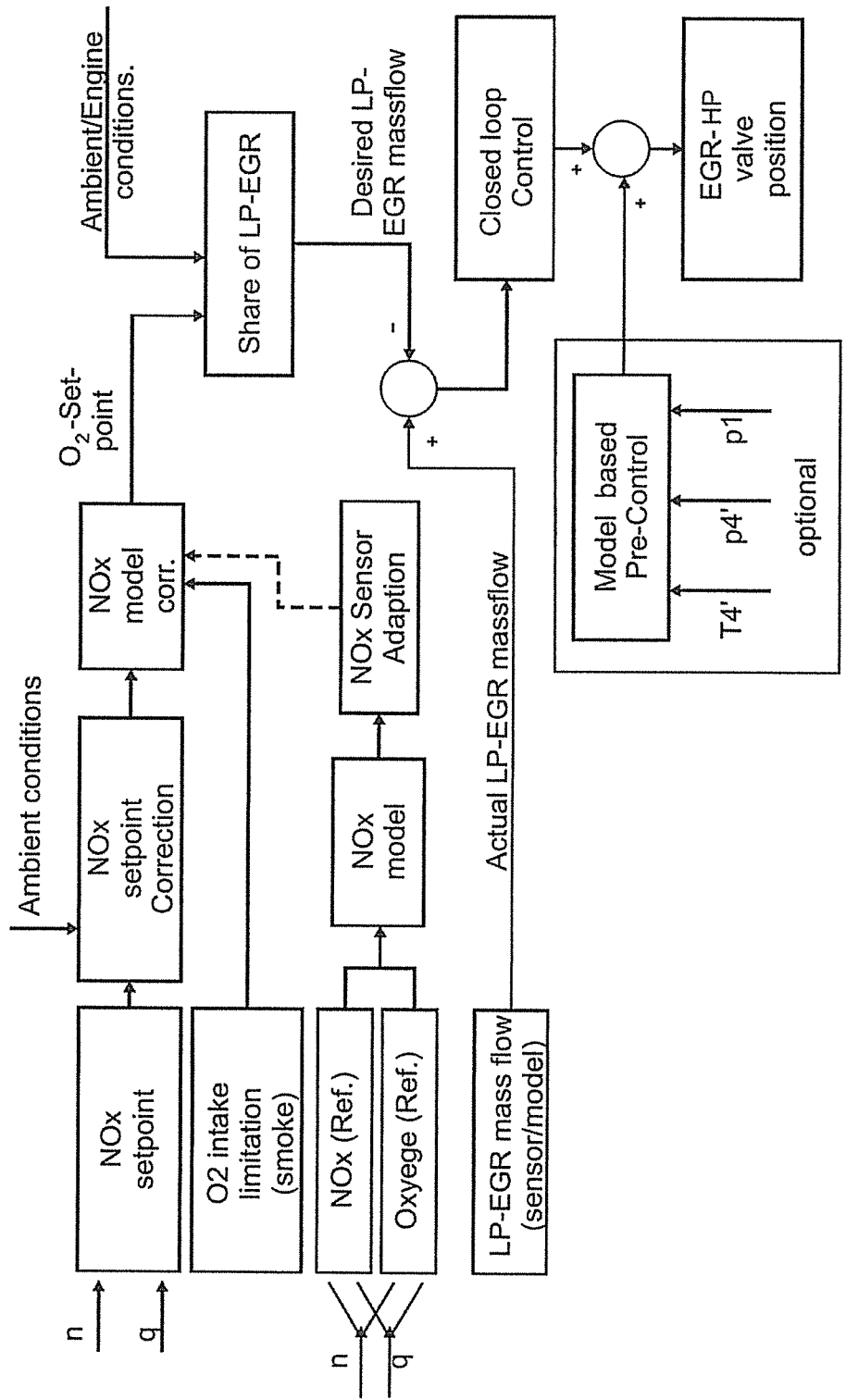

FIG. 9 shows an overview example of a control strategy, particularly taking into consideration a low-pressure exhaust gas recirculation. Here, different values can also be preset or determined on the basis of a given working point of the internal combustion engine, and be used for the further calculation in different models and adaptation particularly of an NOx corrected model for the determination of an oxygen concentration value. By the further determination of the ratio between low-pressure and high-pressure exhaust gas recirculation, and their distribution, as well as the determination of the current mass flow in the low-pressure exhaust gas recirculation path, an adjustment control can then be produced, by means of which the exhaust gas recirculation valve position in the high-pressure path can again be influenced. Here, a more rapid move into the determined position can be produced, if an optional preliminary adjustment control is used. The preliminary adjustment control makes it possible to estimate an approximate value of the position and/or of a time of the opening of the valve. Due to the more precise control in the context of the adjustment control, a more rapid method is possible.

Figure 10:
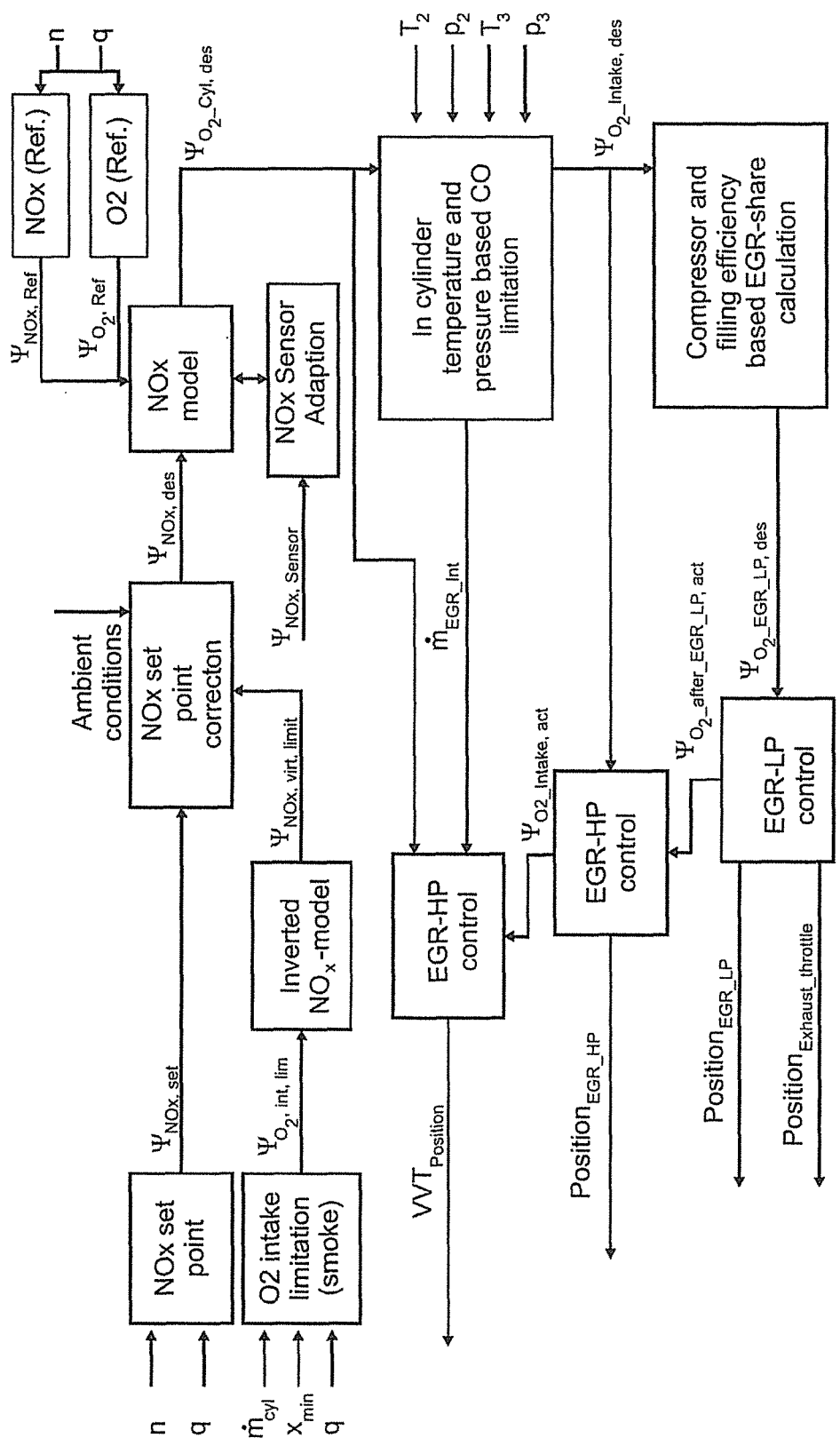

FIG. 10, as an addition to the representation of FIG. 1 or FIG. 2, shows how, taking into consideration the NOx model, a preliminary setting of an NOx correction, and taking into consideration a compression and filling strategy, and the determination of a respective oxygen concentration, a position determination can be set for the respective EGR valve or for one or more valves of the variable valve timing as well as for an exhaust gas flap, in order to make it possible to reduce the nitrogen emission.

Figure 11:
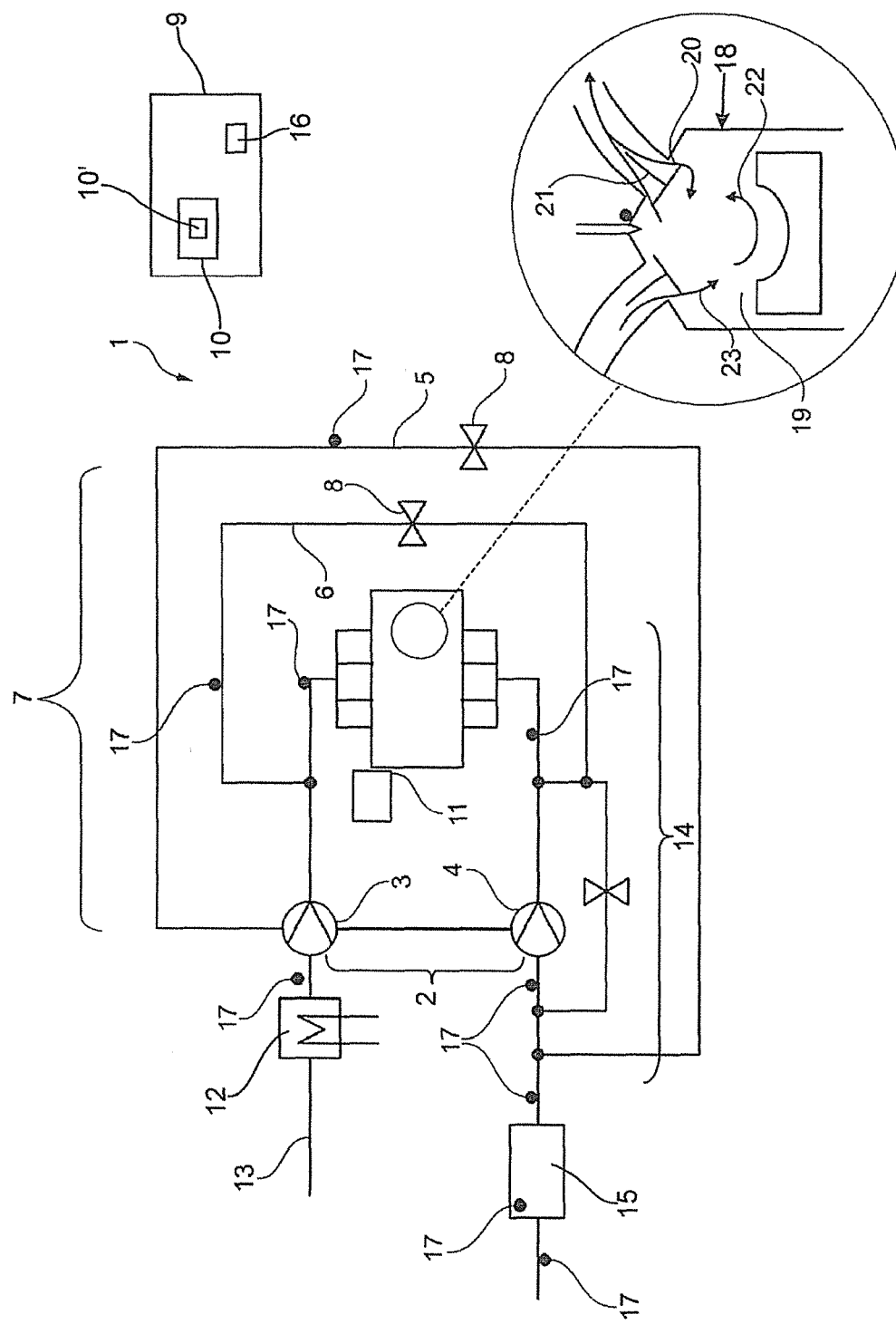
FIG. 11 shows an internal combustion engine in a diagrammatic view, in which the presented method is implemented.

FIG. 11 is a diagrammatic view of an internal combustion engine using a diesel engine 1 as example. The diesel engine 1 presents a compression 2. The compression 2 in this case is represented as an exhaust gas turbo charge. For this purpose, a compressor 3 and an exhaust gas turbine 4 are contained in the aspiration or exhaust gas tract. Moreover, the diesel engine 1 presents a low-pressure exhaust gas recirculation 5 and a high-pressure exhaust gas recirculation 6. The low-pressure exhaust gas recirculation 5 and the high-pressure exhaust gas recirculation 6, in this special case, form an external exhaust gas recirculation 7. The external exhaust gas recirculation 7 presents, in the respective exhaust gas recirculation, an exhaust gas recirculation valve 8. The exhaust gas recirculation valves 8 in each case are settable independently of each other by means of a control or adjustment control device in their position, i.e., with respect to their opening and closing, as well as with respect to their opening cross section. The control and adjustment device can be implemented, for example, in an engine control 9. The engine control 9 can make available a processing unit 10. The processing unit 10 is, for example, a CPU contained in the engine control 9. The engine control 9 can be connected to other control devices, and exchange parameters and other signals with them. In this manner, a valve control device 11 can be provided. The valve control device 11 is capable of changing an opening and closing time or an opening and closing duration of one or more valves of the diesel engine 1. A valve lift can be provided for this purpose, for example, a mechanical valve lift, an electromechanical valve lift, a magnetic valve lift, hydraulic valve lift, as well as combinations thereof in the case of one or several valves, preferably at least in the case of all the outlet valves, particularly preferably all the inlet and outlet valves. Moreover, the diesel engine 1 presents a cooling unit 12. The cooling unit 12 is introduced, for example, into a fresh air feed 13. In particular, the possibility exists that a further additional compression step is present, besides the individually represented compression 2. This compression step can also be associated with a cooling unit. Moreover, the diesel engine 1 presents an exhaust gas tract 14. The exhaust gas tract 14 takes up the exhaust gas exiting from the individual cylinders of the diesel engine, and leads it at least partially to the exhaust gas turbine 4. A portion of the exhaust gas can also be fed via the exhaust gas recirculation 7 to the fresh air feed 13. Moreover, an exhaust gas cleaning device 15 is provided. The exhaust gas cleaning device 15 is indicated diagrammatically. It can present, for example, a catalyst, an unburned carbon particle filter, an NOx reservoir, or another device which is used in the secondary treatment of exhaust gas exiting from the diesel engine 1. For example, a lambda sensor is used as sensor 17. Moreover, a plurality of different sensors 17 can be provided. The sensors can record one or more measurement parameters. For example, a temperature, a mass flow, a pressure or another value can be acquired, and passed on to a subsequent, downstream device. One or more signals from one or more sensors 17 can be applied to the engine control 9 as well as to the different control devices, for example, the valve control device 11. A bus system, for example, can be used for this purpose. Via this system, the information that may be needed can taken up by the control devices, adjustment control and/or control which needs it. In particular, a redundancy of different functions is thus ensured. The engine control 9 can be a device 16 for the determination of a temperature and of a pressure of a residual exhaust gas. This device 16 can, however, also be arranged additionally or alternatively in the control device arranged separately from it. By means of the sensors 17, a plurality of parameters can be determined, which enter in the process.

FIG. 11 shows an enlargement of a cylinder. The cylinder presents a combustion chamber 18. A residual exhaust gas 19 is located in the combustion chamber 18, which remains for one combustion work step in the combustion chamber 18. The residual exhaust gas 19 consists of different portions, each indicated diagrammatically by different arrows. Thus, first portion 20 of exhaust gas is present in the combustion chamber 18, and originates from an internal exhaust gas recirculation. For this purpose, the first portion 20 is transferred via the outlet valve 21 into the exhaust gas tract 14, and then it reaches, from the exhaust gas tract 14, via the outlet valve 21, the combustion chamber 18 again. A second portion 22 of the exhaust gas also remains during the gas exchange from the combustion chamber 18 within the combustion chamber 18. A third portion 23 of the exhaust gas is recirculated again via the external exhaust gas recirculation 7 to the combustion chamber 18. Together, said three portions 20, 22, 23 form the residual exhaust gas 19.

The diesel engine 1 presents the above proposed method at least partially contained in the engine control 9. In this manner, it is possible, by adaptation and determination of the respective oxygen content, to achieve a reduction of nitrogen oxide in the exhaust gas. In particular, by taking into account which residual exhaust gas portions remain in the combustion chamber, which are fed through an internal and an external exhaust gas recirculation into the combustion chamber and in the process taking into consideration which influence results therefrom on the respective composition, particularly in relation to the oxygen concentration and the resulting effect on a possible nitrogen oxide formation in the subsequent combustion work step, it becomes possible, by means of the adjustment control, and particularly also by means of the preset parameters, which are also taken into consideration, to adapt the internal engine combustion to the legal requirements concerning exhaust gas reduction. In particular, the proposed method is also capable, in a self ignition engine which works on the four cycle principle, to allow an adjustment control at a speed, which allows an adaptation adapted to the individual combustion work step. Said adaptation can be selective for a cylinder. However, it can also occur as an overall adjustment control for all the cylinders, or for a number of combined cylinders.

It is to be understood that various modifications are readily made to the embodiments of the present invention described herein without departing from the scope and spirit thereof. Accordingly, it is to be understood that the invention is not to be limited by the specific illustrated embodiments, but by the scope of the appended claims.

I claim:

1. A method for reducing a nitrogen oxide emission in a diesel engine (1), comprising:
    taking at least one exhaust gas of an engine combustion in a combustion chamber (18) and;
    segmenting a first portion (20) of exhaust gas which enters as an internal exhaust gas recirculation from the combustion chamber of the diesel engine via an outlet valve (21) associated with the combustion chamber (18), and is recirculated, via the outlet valve (21), from a subsequent exhaust gas tract (14), into the combustion chamber (18) of the diesel engine (1),
    segmenting a second portion (22) of exhaust gas which remains in the combustion chamber (18) and is not expelled,
    segmenting a third portion (23) of exhaust gas which is recirculated as external exhaust gas recirculation via an exhaust gas recirculation valve (8) into the combustion chamber (18), and
    determining a first temperature of an aspired fresh air intended for the combustion chamber (18) and a second temperature of the residual exhaust gas (19),
    determining, with a processing unit, a NOx value from a stored correlation between NOx and an oxygen concentration in the intake manifold, and calculating with the processing unit (10), a cylinder filling temperature, based on a model for the calculation of the ignition delay and the NOx value from the stored correlation between NOx and the oxygen concentration, and at least the first and second temperature,
    wherein the respective portions (20, 22, 23) of exhaust gas together form a residual exhaust gas (19) in the combustion chamber (18) for a combustion work step, and
    at least one of the residual gas (19) and/or at least one ratio between portions (20, 22, 23) of an exhaust gas in the combustion chamber (18) is set during transient and stationary operation of the diesel engine, based at least in part on the calculated cylinder filling temperature.

2. The method according to claim 1, further including determining during an operation of the diesel engine (1), in a process step, at least one physical variable selected from a temperature or a pressure of the residual exhaust gas (19) in the combustion chamber (18), and calculating a density of the residual exhaust gas (19) and a mass of the residual exhaust as (19) in an additional process step or presetting a density of the residual exhaust gas (19) and a mass of the residual exhaust gas (19) in a start process.

3. The method according to claim 2, further including an oxygen concentration in the combustion chamber (18) is set or adjusted based at least in part on a calculated mass or a predetermined mass of the residual exhaust gas (19).

4. The method according to claim 1, further including determining a distribution of a ratio of the first portion (20) and third portion (23) of the residual exhaust gas (19) based at least in part on the calculated cylinder filling temperature.

5. The method according to claim 1, farther including presetting at least one or more respective portions (20, 22, 23) of the residual exhaust gas (19) or one or more ratios of the respective portions (20, 22, 23) of the residual exhaust gas (19) to each other as a target value in a control.

6. The method according to claim 1, further including adjusting at least one of the first portion (20) of residual exhaust gas (19) and/or the third portion (23) of the residual exhaust gas.

7. The method according to claim 1, characterized in that, via a calculated ignition delay in the combustion chamber (18), a minimum compression end temperature associated with a maximum ignition delay duration is calculated, arid by means of the minimum compression end temperature, a minimum cylinder filling temperature is calculated, to reach the minimum compression end temperature, wherein a distribution of at least one of the first portion (20) or the second portion (22) of the residual exhaust gas in the combustion chamber is adjusted to achieve the minimum compression end temperature.

8. The method according to claim 7, further including determining a physical variable selected from at least one of a temperature or a pressure for the calculation of an ignition delay at a time when an outlet valve (21) of the engine closes, and entering the calculated ignition delay in a calculation of at least one of the residual exhaust gas or the respective portions of the residual exhaust gas.

9. The method according to claim 1, characterized in that at least one of a temperature or a pressure of a fresh air fed to the combustion chamber is determined by at least one of available data or calculated data, wherein the available data or calculated data is based on output of a sensor.

10. The method according to claim 1, further including determining at least one of a temperature, a pressure of the residual exhaust gas (19) or at least one of the respective portions (20, 22, 23) of the residual exhaust gas (19) is determined by means of a sensor (17), and at least one of available data or calculated data.

11. The method according to claim 1, farther including adjusting the first portion (20) of the residual exhaust gas (19) by a variable valve timing and a cylinder tilling temperature in the combustion chamber (18).

12. The method according to claim 1, further including determining a ratio of portions (20, 22, 23) of the residual exhaust gas (19) to each other or the respective portions (20, 22, 23) of the residual exhaust as (19) based at least in part on geometric cylinder data.

13. The method according to claim 1, further including determining, with the processing unit, an unburned carbon value from a stored correlation between unburned carbon and an air-fuel ratio, and calculating with a processing unit (10), the cylinder filling temperature, based on the model for the calculation of the ignition delay, the NOx value from the stored correlation between NOx and the oxygen concentration, the unburned carbon value from the stored correlation between unburned carbon and the air-fuel ratio, and at least the first and second temperature.

14. A method for reducing a nitrogen oxide emission in a diesel engine (1), comprising:
taking at least one exhaust gas of an engine combustion in a combustion chamber (18) and;
segmenting a first portion (20) of exhaust gas which enters as an internal exhaust gas recirculation from the combustion chamber of the diesel engine via an outlet valve (21) associated with the combustion chamber (18), and is recirculated, via the outlet valve (21), from a subsequent exhaust gas tract (14), into the combustion chamber (18) of the diesel engine (1),
segmenting a second portion (22) of exhaust gas which remains in the combustion chamber (18) arid is not expelled,
segmenting a third portion (23) of exhaust gas which is recirculated as external exhaust gas recirculation via an exhaust gas recirculation valve (8) into the combustion chamber (18), and
determining a first temperature of an aspired fresh air intended for the combustion chamber (18) and a second temperature of the residual exhaust gas (19),
determining, with a processing unit, an unburned carbon value from a stored correlation between unburned carbon and an air-fuel ratio, and calculating with the processing unit (10), a cylinder filling temperature, based on a model for the calculation of an ignition delay and the unburned carbon value from the stored correlation between unburned carbon and the air-fuel ratio, and at least the first and the secsnd temperature,
wherein the respective portions (20, 22, 23) of exhaust gas together fort a residual exhaust gas (19) the combustion chamber (18) for a combustion work step, and
at least one of the residual gas (19) and/or at least one ratio between portions (20, 22, 23) of an exhaust gas in the combustion chamber (18) is set during transient and stationary operation of the diesel engine, based at least in part on the calculated cylinder filling temperature.

15. The method according to claim 14, further including determining, with the processing unit, a NOx value from a stored correlation between NOx and an oxygen concentration, and calculating, with the processing unit (10), the cylinder filling temperature, based on the model for the calculation of the ignition delay, the unburned carbon value from the stored correlation unburned carbon and the air-fuel ratio, the NOx value from the stored correlation between NOx and the oxygen concentration, and at least the first and second temperature.

* * * * *